United States Patent
Lee (10) Patent No.: US 8,948,574 B2
(45) Date of Patent: Feb. 3, 2015

(54) MULTIMEDIA RECORDING APPARATUS AND METHOD

(75) Inventor: Kun-Bin Lee, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 1089 days.

(21) Appl. No.: 12/276,744

(22) Filed: Nov. 24, 2008

(65) Prior Publication Data

US 2010/0129051 A1   May 27, 2010

(51) Int. Cl.
| | |
|---|---|
| *H04N 5/76* | (2006.01) |
| *G11B 27/034* | (2006.01) |
| *H04N 9/79* | (2006.01) |
| *H04N 9/82* | (2006.01) |
| *H04N 21/4147* | (2011.01) |
| *H04N 21/426* | (2011.01) |
| *H04N 21/433* | (2011.01) |
| *H04N 21/44* | (2011.01) |
| *H04N 21/4402* | (2011.01) |
| *H04N 21/845* | (2011.01) |
| *H04N 5/44* | (2011.01) |
| *H04N 5/77* | (2006.01) |

(Continued)

(52) U.S. Cl.
CPC ........ *H04N 5/76* (2013.01); *G11B 27/034* (2013.01); *H04N 9/7921* (2013.01); *H04N 9/8227* (2013.01); *H04N 21/4147* (2013.01); *H04N 21/42646* (2013.01); *H04N 21/42661* (2013.01); *H04N 21/4331* (2013.01); *H04N 21/4334* (2013.01); *H04N 21/44016* (2013.01); *H04N 21/44029* (2013.01); *H04N 21/8456* (2013.01); *H04N 5/4401* (2013.01); *H04N 5/772* (2013.01); *H04N 9/8042* (2013.01); *H04N 9/8063* (2013.01)

USPC .......................................... 386/298

(58) Field of Classification Search
CPC ... G11B 27/034; H04N 5/76; H04N 21/4341; H04N 21/44016
USPC ................... 386/200, 291, 294, 298
See application file for complete search history.

(56) References Cited

U.S. PATENT DOCUMENTS 5,282,092 A * 1/1994 Wilhelms ................. 360/5
5,995,705 A * 11/1999 Lang ..................... 386/328

(Continued)

FOREIGN PATENT DOCUMENTS

| CN | 1606875 | 4/2005 |
|---|---|---|
| JP | 1995099628 | 4/1995 |

(Continued)

OTHER PUBLICATIONS

English language translation of abstract of JP 2005-39680 (published Feb. 10, 2005).

(Continued)

*Primary Examiner* — Huy T Nguyen
(74) *Attorney, Agent, or Firm* — McClure, Qualey & Rodack, LLP (57) ABSTRACT

A multimedia recording apparatus includes a receiving unit, a normal recording unit, a pre-recording unit and a combining unit. The receiving unit receives ongoing multimedia information. The normal recording unit generates first multimedia data under a normal recording mode. The pre-recording unit automatically records the ongoing multimedia information to generate a second multimedia data when the normal recording mode is not active. The combining unit adds content of the second multimedia data to the first multimedia data.

35 Claims, 5 Drawing Sheets

(51) Int. Cl.
*H04N 9/804* (2006.01)
*H04N 9/806* (2006.01)

(56) References Cited

U.S. PATENT DOCUMENTS

| | | | |
|---|---|---|---|
| 6,169,842 B1 | 1/2001 | Pijnenburg et al. | |
| 6,233,389 B1 | 5/2001 | Barton et al. | |
| 6,240,244 B1 | 5/2001 | Ikeda | |
| 6,678,463 B1 * | 1/2004 | Pierre et al. | 386/291 |
| 6,937,814 B1 | 8/2005 | Chasen | |
| 6,999,090 B2 | 2/2006 | Obata et al. | |
| 7,020,892 B2 | 3/2006 | Levesque et al. | |
| 7,423,662 B2 * | 9/2008 | Unger | 346/46 |
| 2005/0129049 A1 * | 6/2005 | Srinivasan et al. | 370/432 |

FOREIGN PATENT DOCUMENTS

| | | |
|---|---|---|
| JP | 2004153793 | 5/2004 |
| JP | 2005-39680 | 2/2005 |
| JP | 2005-184635 | 7/2005 |
| WO | WO 2006/095867 | 9/2006 |
| WO | WO 2007/007556 | 1/2007 |

OTHER PUBLICATIONS

English language translation of abstract of JP 2005-184635 (published Jul. 7, 2005).

English language translation of abstract of JP 1995099628 (published Apr. 11, 1995).

English language translation of abstract of JP 2004153793 (published May 27, 2005).

English language translation of abstract of CN 1606875 (published Apr. 13, 2005).

English language translation of abstract of WO 2006/095867 (published Sep. 14, 2006).

English language translation of abstract of WO 2007/007556 (published Jan. 18, 2007).

* cited by examiner

MULTIMEDIA RECORDING APPARATUS AND METHOD

BACKGROUND OF THE INVENTION

1. Field of the Invention

The invention relates to multimedia content recording and particularly relates to ongoing multimedia content recording.

2. Description of the Related Art

Today, multimedia recording is popular and has various applications. For example, there are many types of DVR (Digital Video Recorder) for recording broadcasting programs like television video streams. There are also various DV (Digital Video) or DVCAM (Digital Video Camera) for recording users' daily life into video clips. In addition to video recording, audio recording has even longer history and various low cost products. All these applications have one common feature that are used for recording ongoing multimedia information, i.e. the information to be recorded keeps appearing and then disappearing.

Recording ongoing multimedia information, therefore, usually needs users to decide when to start and when to stop recording. That is, recording apparatuses need instructions, either instantly operation or previous configured settings. But, unless the ongoing multimedia information is already known by users, it is not easy to always correctly record desired video or audio clips completely.

Taking DVCAM as an example, such handheld cameras are used for recording unforgettable or important moments of life. But, it is often that many great scenes are already missed when people want to press the button of "start recording" because these great scenes are gone forever.

To keep such recording apparatuses always recording is one option but it may waste or need much more resources, e.g. power or memory space.

BRIEF SUMMARY OF THE INVENTION

In a first embodiment, a multimedia recording apparatus includes a receiving unit, a normal recording unit, a pre-recording unit and a combining unit. The receiving unit receives ongoing multimedia information. The normal recording unit generates a first multimedia data under a normal recording mode. The pre-recording unit automatically records the ongoing multimedia information to generate a second multimedia data when the normal recording mode is not active. The combining unit adds content of the second multimedia data to the first multimedia data.

In another embodiment, a multimedia recording method includes following steps. Ongoing multimedia information is continuously received. Recording the ongoing multimedia information is started and stopped to generate a first multimedia data under a normal recording mode in response to a first user instruction. The ongoing multimedia information is automatically recorded to generate a second multimedia data when the normal recording mode is not active. At least one part of content of the second multimedia data is added to the first multimedia data in response to a second user instruction.

Therefore, no unforgettable or important moments are missed while there is rich flexibility for satisfying various needs under different design requirements.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
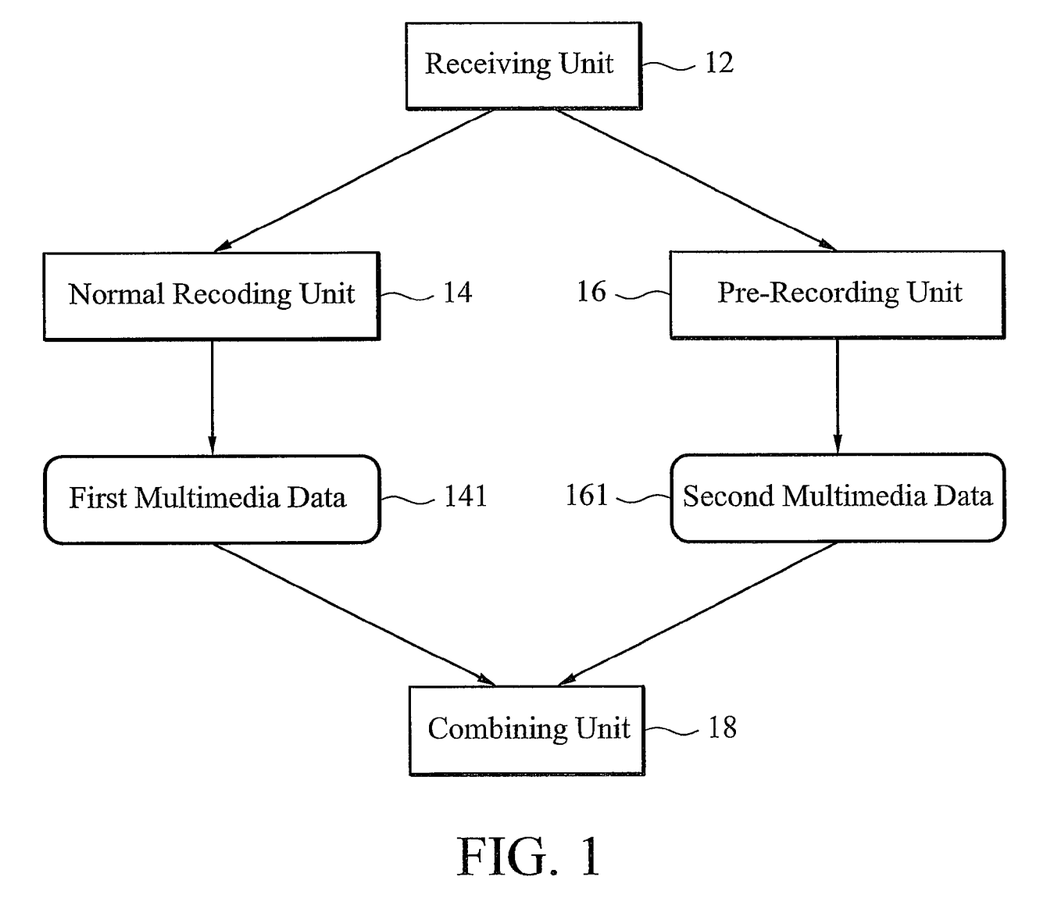
FIG. 1 illustrates a first preferred embodiment of a multimedia recording apparatus.

FIG. 1 is a diagram illustrating a multimedia recording apparatus of a preferred embodiment according to the present invention. The multimedia recording apparatus includes a receiving unit 12, a normal recording unit 14, a pre-recording unit 16 and a combining unit 18 for recording ongoing multimedia information.

It is to be noted that the term "unit" used here does not mean that one "unit" has to be completely separate from another "unit" or one "unit" cannot share certain circuits or programs with another "unit." Under different design requirements, two or more "units" recited above may be designed together and appear as one module, if the module performs both functions of the two "units." For example, the normal recording unit 14 and the pre-recording unit 16 may be designed in one module because these two units may use similar hardware or software for recording data. For example, the normal recording unit 14 and the pre-recording unit 16 may be implemented in the same DSP (Digital Signal Processor).

The receiving unit 12 receives the ongoing multimedia information via a camera, a television decoder or any other device that captures ongoing information and converts the received information in certain format. For examples, the receiving unit 12 captures an ongoing scene and keeps generating a series of video frames as received ongoing multimedia information. The ongoing multimedia information received by the receiving unit 12 then is selectively transmitted to a normal recording unit 14 and a pre-recording unit 16.

The normal recording unit 14 starts and stops recording the ongoing multimedia information to generate a first multimedia data 141 when users instruct the normal recording unit 14 to do so, e.g. via a user instruction of pressing start and stop buttons, respectively. The first multimedia data may be of a first data format like MPEG4, MP3, H.264, AVI, etc and stored in one or more than one files so that users may playback these files later via other machines. Such recording may include encoding, compressing or any commonly known ways for recording multimedia information. When the normal recording unit 14 is recording, it is called under a normal recording mode.

In addition to be sent to the normal recording unit 14, the ongoing multimedia information is also sent to the pre-recording unit 16 to be recorded. Unlike the normal recording unit 14, the pre-recording unit 16 automatically records the ongoing multimedia information to generate a second multimedia data 161 even when the normal recording mode is not active, i.e. the normal recording unit 14 is not active. In other words, the pre-recording unit 16 keeps recording the ongoing multimedia information even users do not press the "start"

button to start normal recording or already press the "stop" button to stop normal recording.

Figure 2:
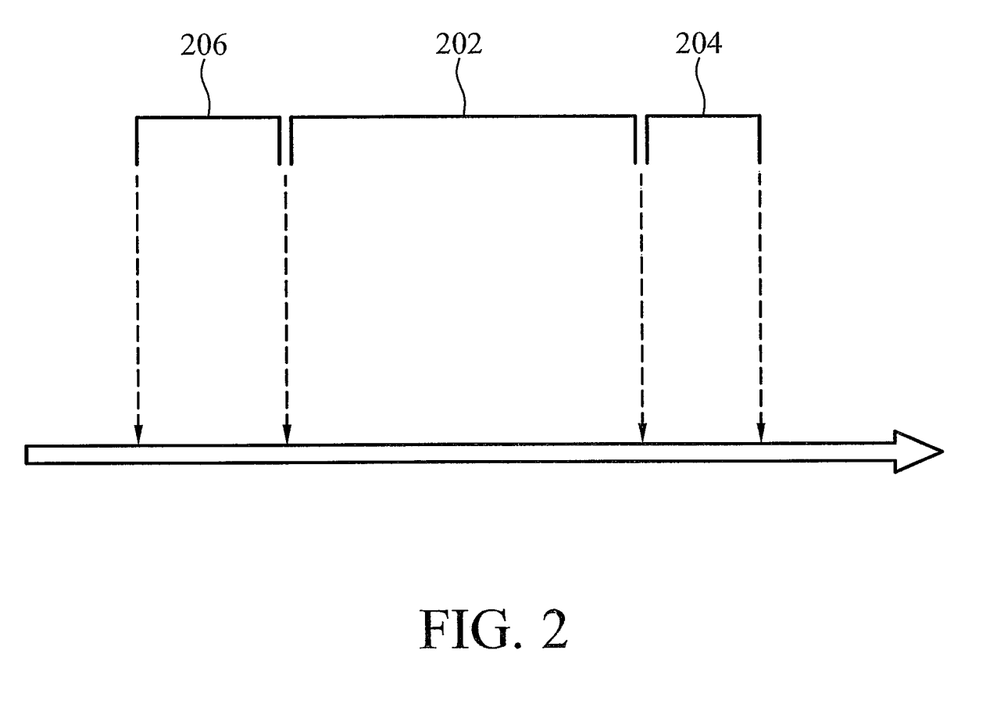
FIG. 2 illustrates time relation of pre-recording and normal recording.

FIG. 2 is a diagram illustrating such time domain relation. A normal recording time period 202 starts when the normal recording unit 14 starts recording and ends when the normal recording unit 14 ends recording. Outside the normal recording time period 202, when the normal recording unit 14 is not under the normal recording mode, the ongoing multimedia information is still recorded within the two pre-recording time periods 204 and 206.

Under different design requirements, the pre-recording unit 16 may be configured to only keep a most current period of the ongoing multimedia information. For example, a pre-recording period, e.g. 20 seconds before a user press "start" button or 20 seconds after the user press "stop" button on the user's recording machine, may be set such that the unforgettable or important moments not recorded by the normal recording unit 14 are still recorded by the pre-recording unit 16.

Because the unforgettable or important moments are also recorded and not lost forever, the combining unit 18 is used for adding part or all of the content of the second multimedia data 161 to the first multimedia data 141 when users want to do so, e.g. via a user instruction like pressing a button or operating a menu item via a user interface. The combining unit 18 may show the second multimedia data 161 for users to determine which segment of the second multimedia data 161 to be combined to the first multimedia data 141. Besides, when the combining unit 18 is showing the second multimedia data 161, the pre-recoding unit 16 may still keep recording the ongoing multimedia information to prevent any unnecessary lost of unforgettable or important moments.

There are various ways to "add" content of the second multimedia data 161 to the first multimedia data 141. For example, only one or more than one video segments of the second multimedia data 161 are inserted before a video segment of the first multimedia data 141. For another example, only audio data of the second multimedia data 161 are inserted to the first multimedia data 141 while video data of the second multimedia data 161 are skipped. Yet for anther example, adding the first multimedia data 141 to the second multimedia data 161 include necessary transcoding or format conversion when the second multimedia data 161 has different format as the first multimedia data 141.

It is also to be noted that the first multimedia data 141 and the second multimedia data 161 may appear in various forms and be stored in various storage devices. In addition, the time period of the most current ongoing multimedia information to be recorded and updated by the pre-recording unit 16 may be determined by the size of a buffer for storing the second multimedia data 161. Moreover, if higher compression rate is set, the time period that the ongoing multimedia information may be held in the buffer may be longer. In other words, the time period may be adjusted.

Moreover, under other design requirements, the length of the most current period to be recorded by the pre-recording unit 16 may be determined dynamically or once for all setting by considering hardware limitation. For example, to save more power, the period of pre-recording may be decreased. For another example, the period of pre-recording may be dynamically adjusted when power level of an associated battery is below a threshold. It is also an option for users to configure such settings and set them to control the operation of the combining unit 18.

Alternatively, the pre-recording unit 16 may keep only partial information of the ongoing multimedia information that is out of a predetermined range in the second multimedia data. That is, the second multimedia data may only keep complete encoded data within a predetermined time period. The second multimedia data outside the predetermined time period may be partially kept, instead of being removed completely. For example, in MPEG encoding, there are I and P frames which contain different volume of information. For P frames outside a predetermined range, e.g. more than 10 seconds ago, these P frames are deleted but I frames outside the predetermined range may still be kept for certain time so that I frames may be utilized later for encoding.

Besides, the data format of the pre-recording, i.e., the second multimedia data 161, may be different or may be the same as the data format of the normal recording, i.e., the first multimedia data 141. For example, to save more memory space, the data format of the pre-recording may have higher compression rate but lower quality but the data format of the normal recording may have lower compression but higher quality. For another example, to simplify hardware design, the pre-recording may use the same kind of encoding hardware and the data format of the pre-recording is the same as the data format of the normal recording.

In other embodiments, the pre-recording unit 16 may start when one or more than one activating pre-recording conditions are met. For example, when a camera or a MP3 recorder is powered on, there is a certain time period before the camera or the MP3 recorder to start normal recording. In such time period, the pre-recording as mentioned above, which may use simplified hardware, may start recording as soon as possible. More specifically, the pre-recording may start when a multimedia recording apparatus is powered on, when a image sensor is ready, when a lens is focused, or when a user presses a button. Besides, motion detection for certain events may be used for starting the pre-recording as various activating conditions. For example, a user may use a camera waiting to capture flying of birds, or waiting for an animal to appear before the camera. Motion detection of desired event may be set and used for starting the pre-recording. When the pre-recording is started, the camera may produce sound or light or e-mail or vibration to inform the user of the event.

Besides, the first multimedia data 141 may be stored in a first storage (not illustrated) and the second multimedia data 161 may be stored in a second storage (not illustrated). When the first storage is removed, e.g. to change another DVD-RW disc, the pre-recording unit keeps recording the ongoing multimedia information.

As mentioned in the background, the ongoing multimedia information may be broadcasting programs like television streams or ongoing events like a birthday party. To record television streams, a television decoder may be integrated in the receiving unit 12. To record the birthday party, a camera unit may be integrated in the receiving unit 12. To more specifically explain the preferred embodiment as mentioned above, two examples are then explained.

Figure 3:
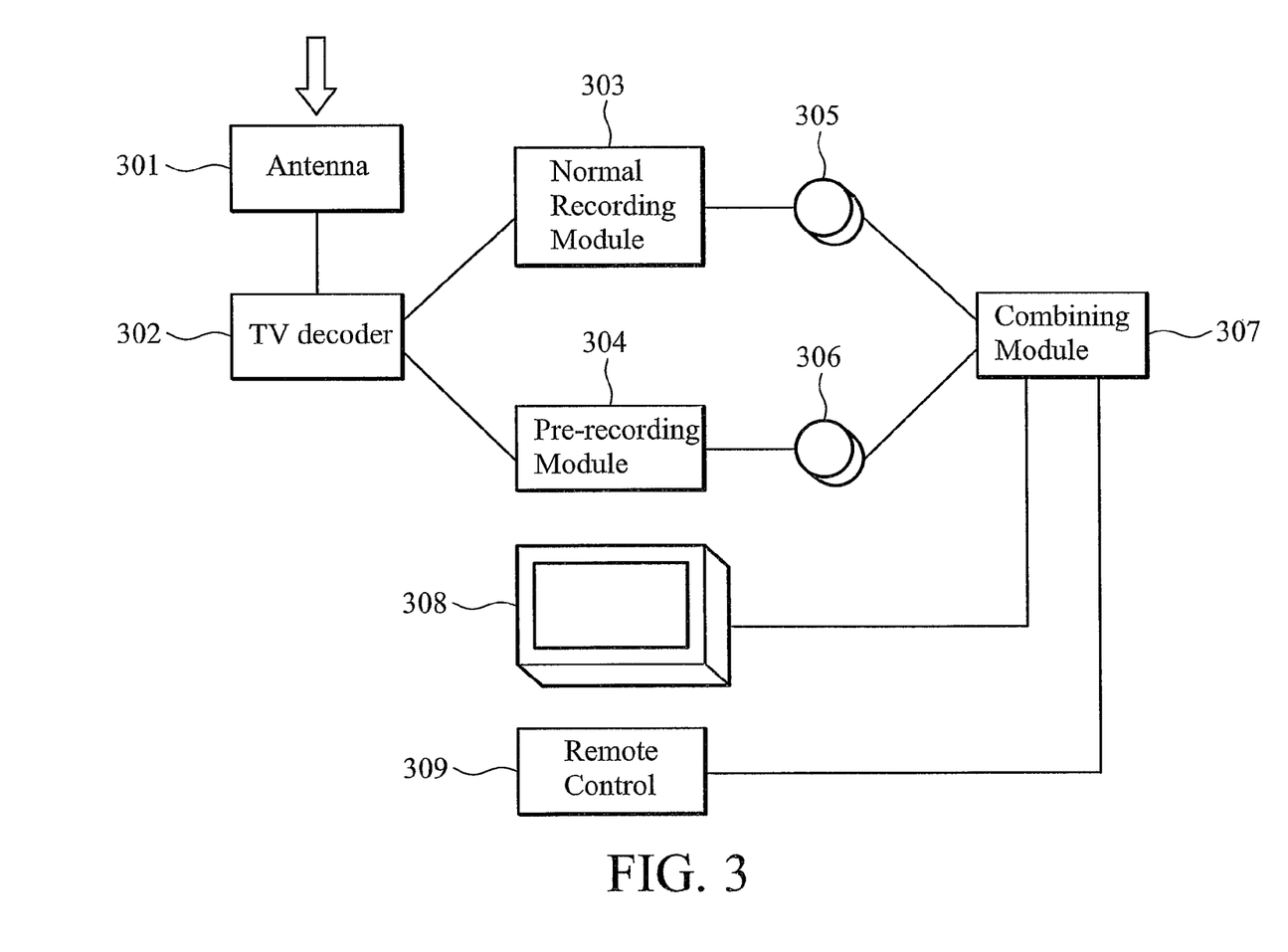
FIG. 3 illustrates an example of the first preferred embodiment that records a television stream.

In the first example, FIG. 3 is a diagram illustrating a DVR that is capable of recording television stream. The television stream is received by a television antenna 301 and decoded by a television decoder 302. The decoded television stream from the television decoder 302 is then supplied to a normal recording module 303 and supplied to a pre-recording module 304. In response to user instruction, e.g. button pressing or schedule recording settings, the normal recording module 303 records the television program into a first storage medium 305, e.g. a hard disk or a DVD-RW disc. Even when the normal recording module 303 is not active, the pre-recording module 304 may still record the ongoing television stream into a second storage medium 306. In response to another user instruction received via a remote control 309, a combining module 307 shows the content of the second storage medium 306 on a display 308 for users to determine whether to add partial or all the content stored in the second storage medium 306 to the first storage medium 305.

Figure 4:
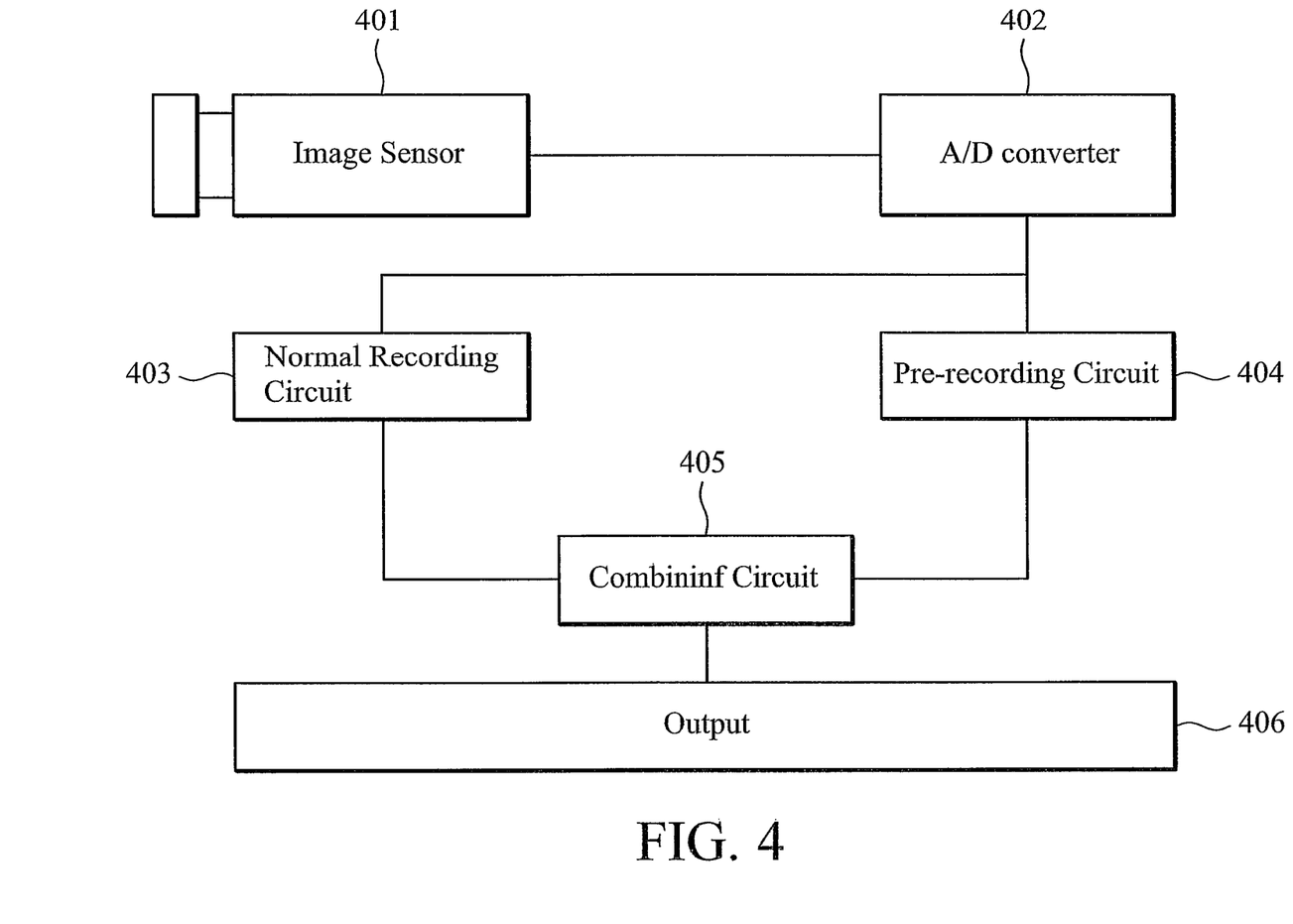
FIG. 4 illustrates another example for capturing outside ongoing events via an image sensor.

In the second example, an image sensor 401 captures image frames via a lens and an A/D converter 402 converts analog data from the image sensor 401 into digital data. The digital data are supplied both to a normal recording circuit 403 and a pre-recording circuit 404. Similarly, a combining circuit 405 is used for adding content not recorded under normal recording mode to a final output medium, e.g. a DVD-RW disc 405.

Figure 5:
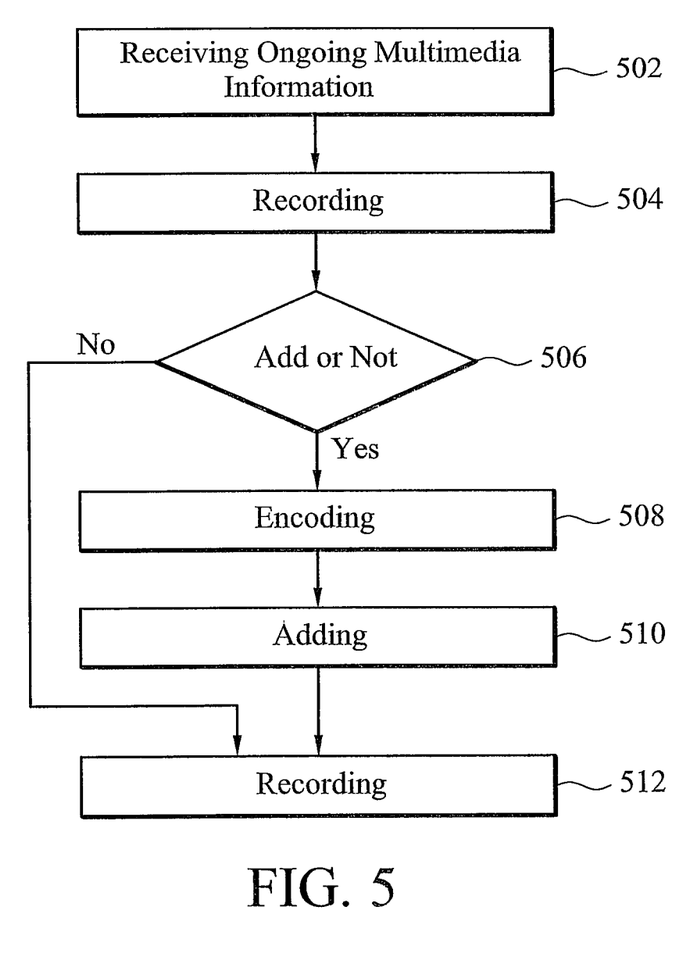
FIG. 5 is a flowchart that illustrates another preferred embodiment.

Another aspect of the present invention includes a multimedia recording method for recording ongoing multimedia information. FIG. 5 is a flowchart to illustrate such method. First, ongoing multimedia information is received (step 502). The ongoing multimedia information is recorded into a first multimedia data under normal recording mode and recorded into a second multimedia data even not under normal recording mode (step 504). Users are inquired to decide whether to add part or all pre-recording content in the second multimedia data to the first multimedia data (step 506). If the pre-recording content are to be added, the pre-recording content to be added are encoded to the same format as that of the first multimedia data (step 508). The encoded data are then added to the first multimedia data (step 510) and a final recorded output is generated (step 512).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multimedia recording apparatus, comprising:
a receiving unit for receiving ongoing multimedia information;
a normal recording unit for starting and stopping recording the ongoing multimedia information to generate a first multimedia data under a normal recording mode in response to a first user instruction;
a pre-recording unit for automatically recording the ongoing multimedia information to generate a second multimedia data when the normal recording mode is not active; and
a combining unit for adding at least part of content of the second multimedia data to the first multimedia data in response to a second user instruction, wherein at least one non-I frame of the second multimedia data is removed.

2. The multimedia recording apparatus of claim 1, wherein the combining unit shows the second multimedia data to a user for the user to determine the second user instruction.

3. The multimedia recording apparatus of claim 2, when the combining unit shows the second multimedia data to the user, the pre-recoding unit still records the ongoing multimedia information.

4. The multimedia recording apparatus of claim 1, wherein the second multimedia data include content appeared before the first multimedia data in the ongoing multimedia information in time domain.

5. The multimedia recording apparatus of claim 1, wherein the second multimedia data include content appeared after the first multimedia data in the ongoing multimedia information in time domain.

6. The multimedia recording apparatus of claim 1, wherein the pre-recording unit only keeps a most current period of the ongoing multimedia information in the second multimedia data.

7. The multimedia recording apparatus of claim 6, wherein the length of the most current period of the ongoing multimedia information to be kept is determined by considering hardware condition.

8. The multimedia recording apparatus of claim 6, wherein the length of the most current period of the ongoing multimedia information to be kept is determined by user setting.

9. The multimedia recording apparatus of claim 1, wherein the pre-recording unit keeps only partial information of the ongoing multimedia information that is out of a predetermined range of time domain in the second multimedia data.

10. The multimedia recording apparatus of claim 1, wherein the second data contain halfway encoded data that need further processing.

11. The multimedia recording apparatus of claim 1, wherein the first multimedia data are of a first data format, the second multimedia data are of a second data format, and the first data format is not the same as the second data format.

12. The multimedia recording apparatus of claim 1, wherein the first multimedia data are of a first data format, the second multimedia data are of a second data format, and the first data format is the same as the second data format.

13. The multimedia recording apparatus of claim 1, wherein the pre-recoding unit starts recording when one or more than one activating pre-recording conditions are met.

14. The multimedia recording apparatus of claim 1, wherein the first multimedia data are stored in a first storage and the second multimedia data are stored in a second storage, and when the first storage is removed temporarily, the pre-recording unit keeps recording the ongoing multimedia information.

15. The multimedia recording apparatus of claim 1, wherein the receiving unit contains a decoder for obtaining a broadcasting program.

16. The multimedia recording apparatus of claim 1, wherein the receiving unit contains a camera unit for capturing ongoing events into the ongoing multimedia information.

17. The multimedia recording apparatus of claim 1, wherein the pre-recording unit records audio data and the normal recording unit records both audio data and video data.

18. The multimedia recording apparatus of claim 1, wherein a most current time period of the ongoing multimedia information is updated in a buffer by the pre-recording unit, and the length of the most current time period is determined by the size of the buffer.

19. The multimedia recording apparatus of claim 1, wherein the pre-recording unit continues to record the ongoing multimedia information when the normal recording unit is stopped in response to the first user instruction.

20. A multimedia recording method, comprising:
receiving ongoing multimedia information;
starting and stopping recording the ongoing multimedia information to generate a first multimedia data under a normal recording mode in response to a first user instruction;
automatically recording the ongoing multimedia information to generate a second multimedia data when the normal recording mode is not active; and
adding at least part of content of the second multimedia data to the first multimedia data in response to a second user instruction, wherein at least one non-I frame of the second multimedia data is removed.

21. The multimedia recording method of claim 20, further comprising:
    showing the second multimedia data to a user for the user to determine the second user instruction.

22. The multimedia recording method of claim 21, wherein when the second multimedia data is shown to the user, the ongoing multimedia information is still recorded to generate the second multimedia data.

23. The multimedia recording method of claim 20, wherein the second multimedia data include content before the first multimedia data in the ongoing multimedia information.

24. The multimedia recording method of claim 20, wherein the second multimedia data include content after the first multimedia data in the ongoing multimedia information.

25. The multimedia recording method of claim 20, wherein only a most current period of the ongoing multimedia information is kept in the second multimedia data.

26. The multimedia recording method of claim 25, wherein the length of the most current period of the ongoing multimedia information to be kept is determined by considering hardware condition.

27. The multimedia recording method of claim 25, wherein the length of the most current period of the ongoing multimedia information to be kept is determined by user setting.

28. The multimedia recording method of claim 20, wherein only partial information of the ongoing multimedia information that is out of a predetermined range of time domain is kept in the second multimedia data.

29. The multimedia recording method of claim 20, wherein the second data contain halfway encoded data that need further processing.

30. The multimedia recording method of claim 20, wherein the first multimedia data are of a first data format, the second multimedia data are of a second data format, and the first data format is not the same as the second data format.

31. The multimedia recording method of claim 20, wherein the first multimedia data are of a first data format, the second multimedia data are of a second data format, and the first data format is the same as the second data format.

32. The multimedia recording method of claim 20, wherein the pre-recoding unit starts recording when one or more than one activating pre-recording conditions are met.

33. The multimedia recording method of claim 20, wherein the first multimedia data are stored in a first storage and the second multimedia data are stored in a second storage, and when the first storage is removed temporarily, the ongoing multimedia information is still recorded into the second multimedia data.

34. The multimedia recording method of claim 20, wherein a most current time period of the ongoing multimedia information to be stored in the second multimedia data is updated in a buffer, and the length of the most current time period is determined by the size of the buffer.

35. The multimedia recording method of claim 20, wherein the second multimedia data continues to be generated by recording the ongoing multimedia information when the first multimedia data is stopped in response to the first user instruction.

* * * * *